March 1, 1960 W. R. PLUMMER 2,927,192
WELDING GUN ASSEMBLY
Filed Nov. 25, 1957 8 Sheets-Sheet 1

FIG. 1

INVENTOR.
WILLIAM R. PLUMMER
BY
ATTORNEY

March 1, 1960 W. R. PLUMMER 2,927,192
WELDING GUN ASSEMBLY
Filed Nov. 25, 1957 8 Sheets-Sheet 5

INVENTOR.
WILLIAM R. PLUMMER
BY
ATTORNEY

United States Patent Office 2,927,192
Patented Mar. 1, 1960

2,927,192

WELDING GUN ASSEMBLY

William R. Plummer, Berkley, Mich., assignor to Allied Welder Corporation, Dearborn, Mich., a corporation of Michigan Application November 25, 1957, Serial No. 698,448

7 Claims. (Cl. 219—89)

This invention relates to a novel welding gun assembly and actuating means therefor and particularly pertains to a combination of a power-actuated gun having interconnected pivotally disposed power-operated jaws wherein the electric current is transmitted through the pivot pin of the device to one of the jaws in forced engagement due to the clamping pressure of the hydraulic operating cylinder to provide a highly conductive pressured connection between the pivot pin and the jaw and wherein the pivot pin jaws and arms are all cooled with water via co-axially disposed conduits and wherein the hydraulic cylinder, booster, fluid supply, and welding current are supplied and coordinated together to form an efficiently operating unit.

The utility and economy of power actuated opening and closing jaw welding guns is well established as these guns save the user much valuable time and render the work easier so that more productive hours at high capacity are provided, however, the several devices of the prior art have not proven satisfactory in use due to their early breakdown under high production conditions due to the fact that the welding current contacts in most guns are loose occasioning heating due to the current resistance and also due to the fact that the tips mushroom under the hot condition and require replacement more often than should be necessary. When the gun, pivot points and electrodes heat excessively after wear has occasioned looseness of the parts, the jaws of conventional guns get out of alignment so that the welding tips are not diametrically opposed so that poor welds are produced and much more current is demanded than should be required; this condition also results in overheating and destruction of the equipment sooner than should be necessary. The prior art devices have also proven not entirely satisfactory inasmuch as they are complicated in design and construction, expensive to manufacture and maintain, and difficult to repair and keep running in high production use.

With the foregoing in view, the primary object of the invention is to provide a power-operated jaw welding gun and assembly and a power-actuator and supply therefor which is simple in design and construction, inexpensive to manufacture, easy to use, and easy to repair and maintain.

An object of the invention is to provide a welding gun assembly wherein one side of the welding current is solidly connected to the pivot pin and transmitted via the pivotal connection therebetween radially to the jaw so that the power cylinder on the jaws forces the pivot pin and the jaw into pressure contact with each other as a practically solid conductor to eliminate resistance heating, arcing, and wear between moving electrical conducting parts.

An object of the invention is to provide a slide guide chamber in one jaw element and in insulated sliding guide block on the other jaw element spaced from the pivotal pin between the jaws so that the block and chamber sidewalls relieve any twisting, turning, or dislocating motion in the jaws at the pivotal point so as to insure longer pivotal pin life and that the electrodes are diametrically opposed when clamped regardless of the forces set up in clamping the electrodes.

An object of the invention is to provide a cooling fluid chamber in the pivot pin fed by a co-axial tube which penetrates to the far end of the pin.

An object of the invention is to provide co-axial cooling fluid tubes in the jaw cooling chambers so that the cooling fluid is fed directly to the tip by the internal co-axial coolant channeling member.

An object of the invention is to feed the cooling fluid to the welding tips and to the inner most portion of the pivot pin via inner co-axial tube members so that the returning fluid completely surrounds the inner co-axial member thereby insulating the cold introduced fluid from contact with the welding gun assembly until it reaches the welding tips so that the introduced fluid is kept cold until it reaches the hottest point so that it has a much higher heat absorbing capacity to carry off the heat from the hottest points which prolongs the welding tip life and eliminates the heat travelling in the supporting jaw arms and gun assembly so that the gun assembly and arms remain cool.

An object of the invention is to provide a force contact between the jaws and pivot pin by the power means operating the jaws to clamp the electrodes thereby obviating the necessity for having auxiliary equipment to particularly and especially clamp and force the contact surfaces together in the pivot pin and jaw connection.

An object of the invention is to provide a novel double-acting air-hydraulic booster assembly for operating the hydraulic cylinder which powers the gun jaws in clamping and unclamping.

An object of the invention is to provide a novel housing for the hydraulic cylinder incorporating an alternate conduit via an enlarged section in the cylinder side walls so that the connections to the cylinder can all be made at either end thereby eliminating interference of the connections at either end with the operator.

These and other objects of the invention will become apparent by reference to the following description of a welding gun assembly and power-actuating means embodying the invention taken in connection with the accompanying drawings, in which:

Fig. 7 is a cross-sectional view of Fig. 2 taken on the line 7—7 thereof showing the co-axial coolant fluid conduits and couplings in more detail.

Referring now to the drawing wherein like numerals refer to like and corresponding parts throughout the several views, the power operated welding gun assembly and power actuating means disclosed therein to illustrate the invention comprises welding gun assembly 30 which has hinged jaws actuated by the hydraulic cylinder 32 as powered by the double acting air-hydraulic booster assembly 33; the cable 34 contains the electrical wires and coolant conduits for supplying welding current and travelling cooling fluid from the welding gun assembly respectively as hereinafter more fully described.

The welding gun assembly 30, Figs. 1–5, 8 and 9 comprises an L-shaped stationary jaw 40 having an upper power actuator leg 41, a lower clamping socket leg 42, and an intermediate hinge bearing boss 43 receiving the pivot pin 44; the movable jaw 45 is equipped with a clamping socket leg 46 at one end, an upper actuator leg 47, and an intermediate yoke 48 straddling the hinge bearing boss 43 and journaled on the pivot pin 44 completing the hinge relationship between the jaws. The power cylinder 32 is fixed on the stationary jaw upper leg 41 and its piston rod 49 leads through an opening 50 in the leg 41 and is connected to the movable jaw actuator leg boss 47 via the link 51 so that outward movement of the piston rod 49 advances the paired clamping jaw socket ends 42 and 46 toward each other and inward movement of the piston rod 49 retracts the jaw ends away from each other so that the paired welding electrodes 52 and 53 on the paired extension leg holders 54 and 55 held in the jaw socket ends 46 and 42 respectively are closed in forced welding condition and opened relative to each other and the workpiece 56.

Figure 6:
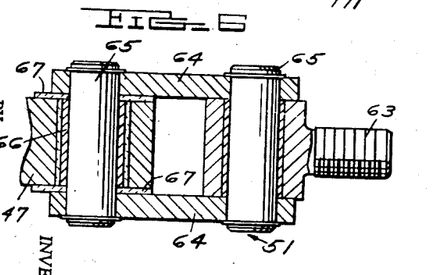
Fig. 6 is a cross-sectional view of Fig. 2 taken on the line 6—6 thereof showing the jaw actuating link assembly in more detail.

Welding current from the cable 34 terminal 60 is fed directly to the stationary jaw terminal 61 whereby current is communicated to electrode 53 via the stationary jaw 40 and extension leg 55 and since current to the other electrode 52 is communicated by the movable jaw 46 it is obvious that the jaws must be electrically insulated from each other at all points. To this end, the cylinder 32 is separated from the jaw 40 by the spacer 62 and the piston rod 49 is separated electrically from the movable jaw 45 by the insulating linkage assembly 51, Figs. 1, 2, and 6, which includes a bolt 63 threaded in the piston rod 49, links 64, and pins 65, and it is to be noted that the pin 65 in the movable jaw boss 47 and the links 64 are separated electrically from the jaw boss 47 by the insulator sleeve 66 and insulator washers 67. The cable 34 terminal connections are insulated with an insulator washer disposed between the cable terminals 60 and 68, a sleeve insulator 69 surrounding the bolt 70, and insulator washers 71 at the bolt head and nut with the terminal 68 electrically communicating with the jumper arm 72 leading to the movable jaw 46 so that the bolt 70 and nut 73 hold the terminals in solid electrical contact with the jaw portions electrically insulated from each other.

Figures 8, 9:
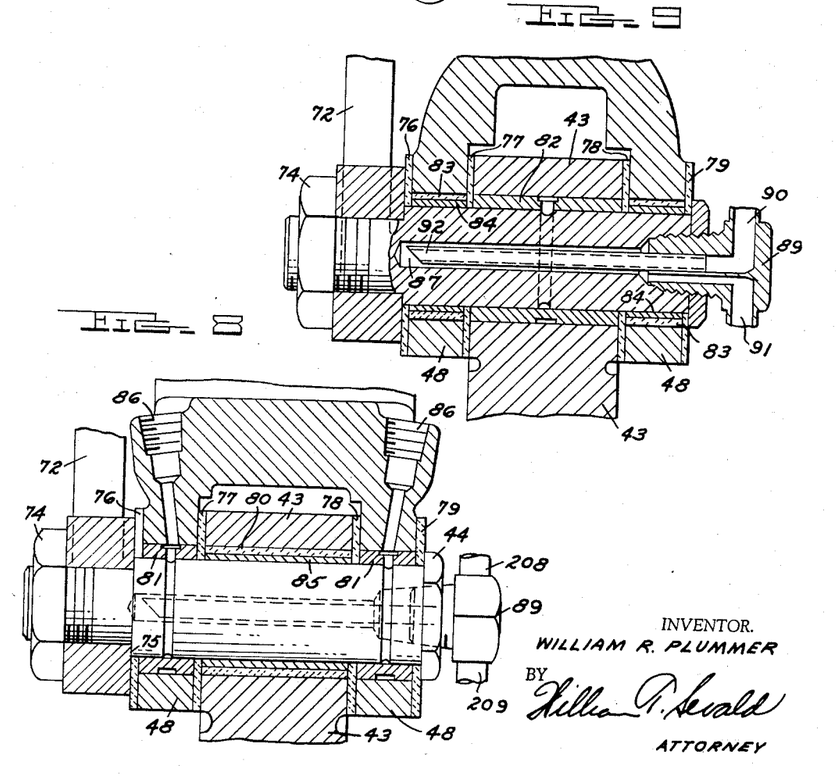
Fig. 8 is a cross-sectional view of Fig. 2 taken on the line 8—8 thereof showing the jaw pivot pin and jaw assembly particularly detailing the contacting and insulated portions of the jaw, yoke, and journal.
Fig. 9 is a view similar to Fig. 8 showing the opposite disposition of the insulated and electrical conducting members.

The jumper arm 72 leads downwardly from the cable terminal 68 and has an aperture receiving the pivot pin 44 extending end so that when the pivot pin nut 74 is tightened the pivot pin 44 is in solid electrical communication with the jumper arm 72, Fig. 8, as the shoulder 75 on the pin 44 opposes the nut 74. However, the stationary jaw hinge bearing boss 43 and the movable jaw hinge bearing yokes 48 are insulated electrically from each other by the insulator washers 76, 77, 78, and 79 and the movable jaw bearing boss 43 is insulated electrically radially from the pivot pin by the insulator sleeve 80 so that the jaws are electrically separated at their hinge portion. The pivot pin 44 is in electrical communication with the movable jaw hinge bearing yoke via the conductor sleeves 81 so that current travels from the cable terminal 68, Figs. 1, 3, and 8 to the electrode 52 via the jumper arm 72, pivot pin 44, sleeves 81, yoke 48, movable jaw 46, and holder arm 54.

It can now be seen that when the piston rod is extended to clamp the electrodes 52 and 53 together, the pivot pin 44 is the fulcrum point for the leverage of the jaws and it is to be noted that the pivot pin 44—conductor sleeve 81—yoke 48 are the only movable conductor elements as all the others are fixed solid. However, these movable conductor elements are frozen solid in the gun clamped condition by the clamping force radially exerted through the pivot pin 44, conductor sleeve 81, and yoke 48 as this is the fulcrum point controlling the reaction of the electrodes 52 and 53 to the force exerted by the power cylinder 32 so that there is no electrical resistance or arcing in the pivot pin 44 to movable jaw yoke 48 electrical connections due to spacing as the parts are frozen solid.

Inverse electrical connection between the pivot pin 44 and the stationary jaw bearing boss 43 is shown in Fig. 9, with the conductor sleeve 82 disposed therebetween and with the insulator sleeves 83 disposed between the pivot pin and the movable jaw yoke 48. The anti-friction bearing sleeve spacers 84, Fig. 9, and 85, Fig. 8, facilitate manufacturing assembly with pivot pin electrical contact to either jaw and also provide metal anti-friction surfaces for the pin 44 which are lubricated via the fittings 86 and associated channels. The pivot pin 44 area is cooled via the axial chamber 87 in the pin 44 which is blind at one end and equipped with a dual inlet-outlet fitting 88 at the other end co-axially supporting the tube 92 in the chamber 87 and feeding coolant to the blind end via channel 90 and returning the coolant via the channel 91 in the fitting 89. It is to be noted that the tube 92 does not contact the pin 44 and is thermally insulated therefrom by the returning coolant in the chamber 87 so that cold coolant is fed to the innermost point of the chamber 87 to provide high heat absorption at that point to eliminate heat back travel along the parts and to carry off inductive heat and keep the gun cool.

The extension holder arms 54 and 55 are removably clamped in the jaw clamping ends 42 and 46 so that various extensions can be used with the same gun to project the electrodes into the body of a workpiece as desired, and, to maintain the electrodes in alignment in an extended condition under high clamping forces, the stationary jaw upper leg 41 is provided with a slide bearing guide cavity 93 housing the insulator bearing slide block 94 fixed on the projection 95 on the movable jaw 45 so that alignment of the electrodes on one side of the pivot pin 44 hinge is maintained not only by the hinge but also by the guide block 94 and guide cavity 93 on the other side of the pivot pin 44.

Figure 1:
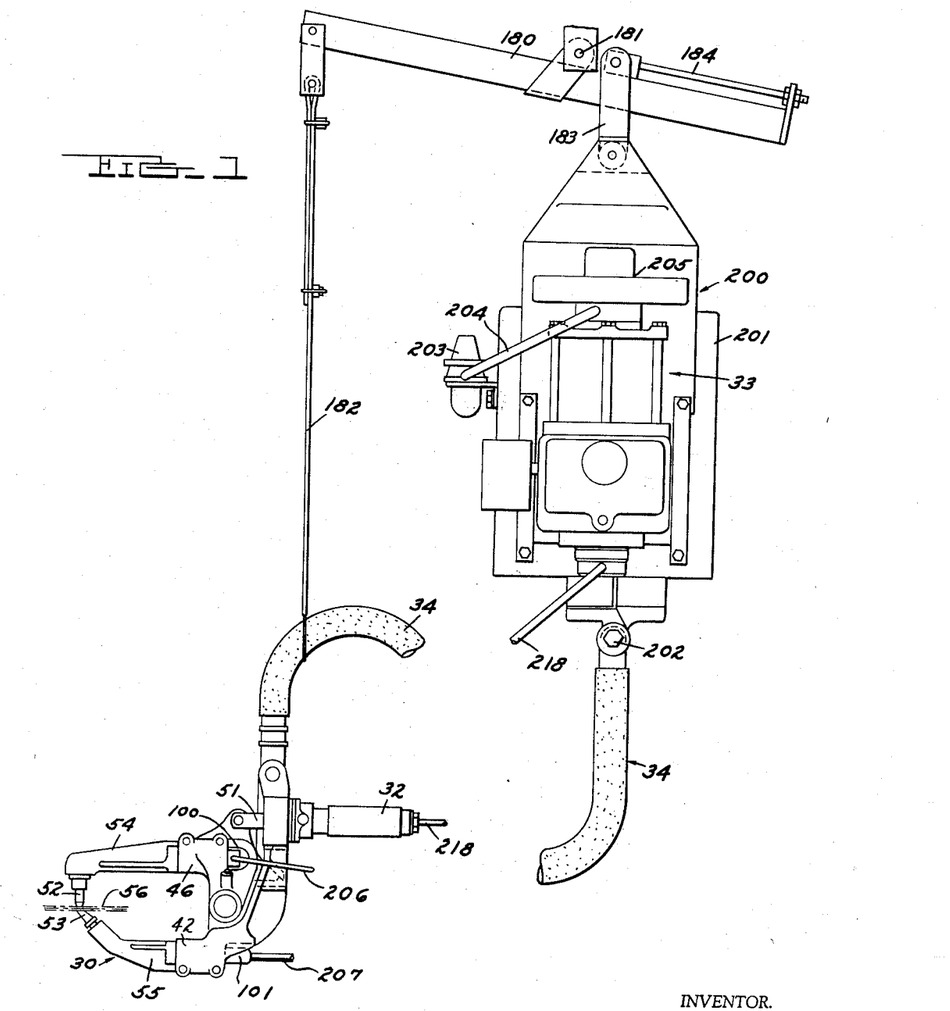
Fig. 1 is a plan elevational view of the welding gun assembly and power actuating mechanism.
Figure 2:
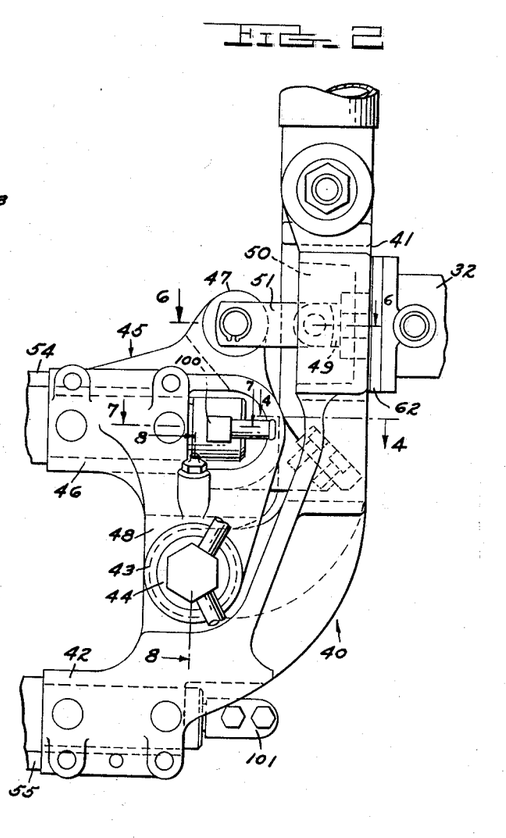
Fig. 2 is an enlarged view of a portion of the welding gun assembly seen in Fig. 1.
Figure 12:
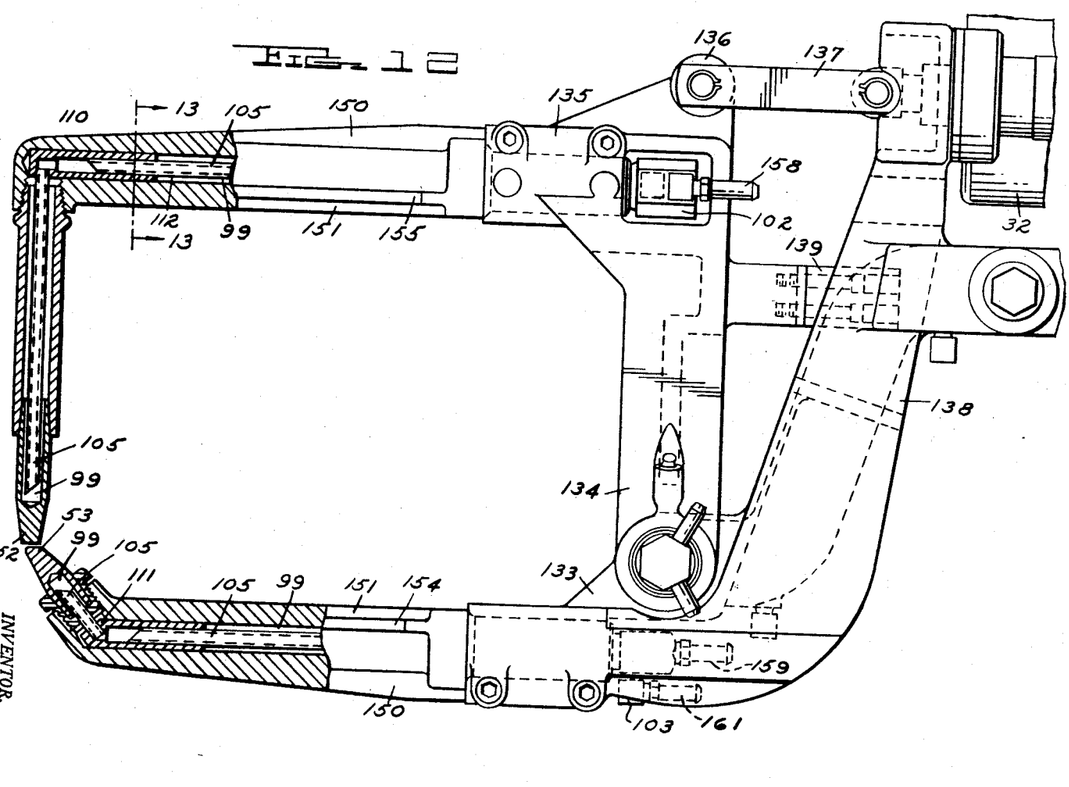
Fig. 12 is a side-elevational view of a welding jaw and arm and tip assembly similar to Fig. 2 showing the co-axial fluid conduits in more detail.
Figure 18:
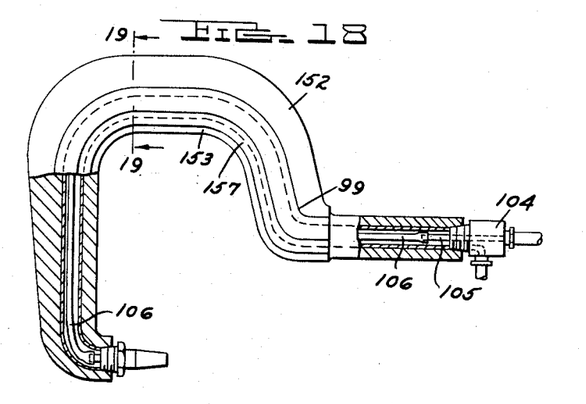
Fig. 18 is a side-elevational view, partly in cross section, of a hook shaped electrode welding tip holding arm illustrating a flexible conduit tubing co-axially disposed for channeling the coolant fluid directly to the tip.
Figure 19:
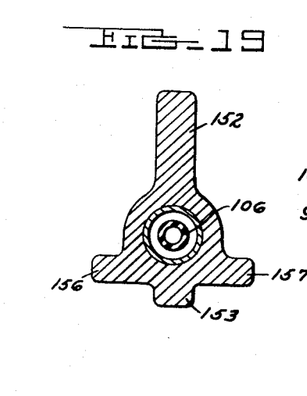
Fig. 19 is a cross-sectional view of Fig. 18 taken on the line 19—19 thereof showing the arm cross-sectional construction.

Various shaped electrode holder extension legs can be used with the gun 30 and held in the jaw socket ends 42 and 46 such as seen in Figs. 1, 12, and 18 and it is to be noted that the rear side of the socket ends 42 and 46 are open permitting direct coolant fluid connection to the internally channelled holders such as by the fittings 100 and 101 of Fig. 1, fittings 102 and 103 of Fig. 12, and fittings 104 of Fig. 18. In this connection each fitting 100—104 is provided with a co-axial coolant feed tube 105 connecting to a co-axial coolant feed tube 106 to the electrode tip such as seen in Fig. 18 wherein the tube 106 is a neoprene flexible tube threadable through the convolutions of the holder internal channel 99.

Figure 3:
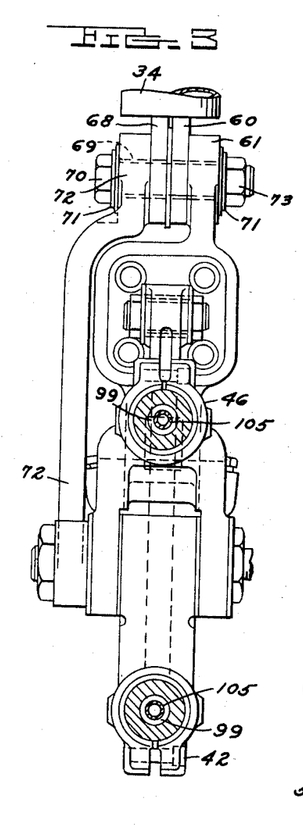
Fig. 3 is an end elevational view of the device seen in Fig. 2, partly in cross-section.
Figure 4:
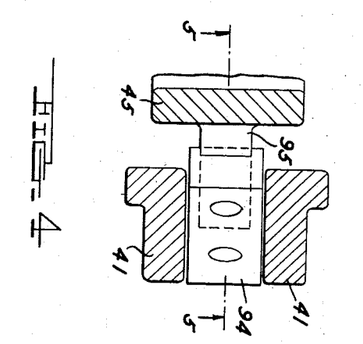
Fig. 4 is a cross-sectional view of Fig. 2 taken on the line 4—4 thereof showing the guide block assembly and chamber in more detail.
Figure 5:
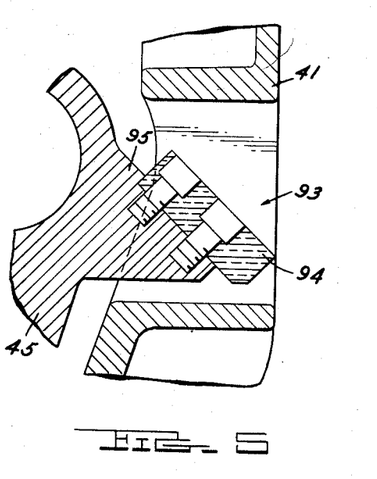
Fig. 5 is a cross-sectional view of Fig. 4 taken on the line 5—5 thereof.

The holder channels 99 can be cored in casting such as seen in Figs. 3 and 12 or a tube 108, Fig. 18, can be cast-in forming the channel where coring is too difficult. The co-axial coolant tubes 106 are adapted to lead around bends and turns in the holder arms, Fig. 12, via nipples 110 and 111 which make the turn between one section of the tube 106 and another section and the nipples are so formed, Fig. 13, that they provide communication spaces 112 for coolant in the channel 99. In all instances, it is to be particularly noted that the coolant supply tubes 106 and nipples 110 and 111 lie coaxially in the channels 99 so that coolant is fed directly to the welding electrode tips 52 and 53 to flow cold coolant thereover at the hottest point to get proportionately more heat absorption at the tip by a greater differential between the temperature of the tip and the coolant and the in-flowing coolant is kept cool and thermally insulated from the holders by the co-axially surrounding out-flowing coolant from the tips.

The modified gun 130 of Fig. 12 comprises a stationary jaw supporting the power cylinder at the upper end 131, a holder socket end 132, and an intermediate hinge bearing 133 which hingedly connects with the movable jaw intermediate yoke 134 disposed below the clamping socket end 135 and boss 136 connected via the links 137 to the piston rod 49. The stationary jaw is provided with a slide bearing cavity 138 slidably housing the slide bearing block 139 secured to the projection 140 on the movable jaw to support the hinge connection to keep the welding tips in alignment under conditions of extended projection and high clamping force.

Figure 13:
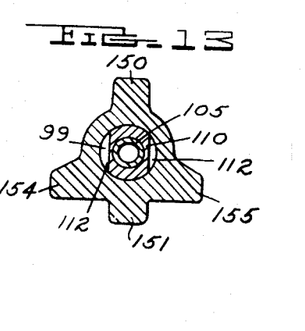
Fig. 13 is a cross-sectional view of Fig. 12 taken on the line 13—13 thereof showing the arm extension construction and co-axial fluid conduit.
Figure 14:
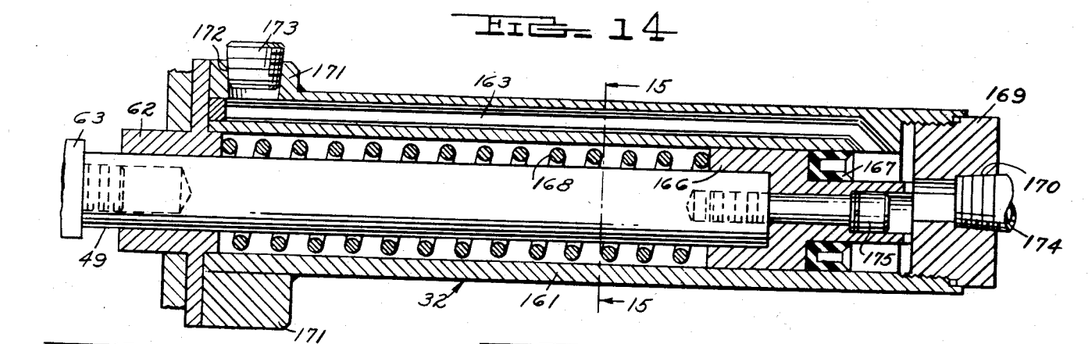
Fig. 14 is a longitudinal cross-sectional view of the hydraulic cylinder assembly.
Figure 15:
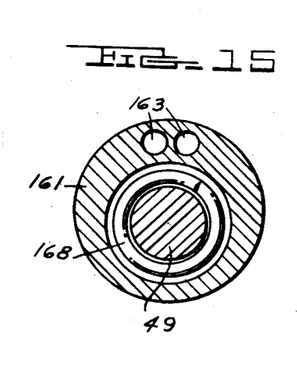
Fig. 15 is a cross-sectional view of Fig. 14 taken on the line 15—15 thereof showing the enlarged sidewall portion and integral fluid conduits for locating the couplings at one end of the cylinder.
Figure 16:
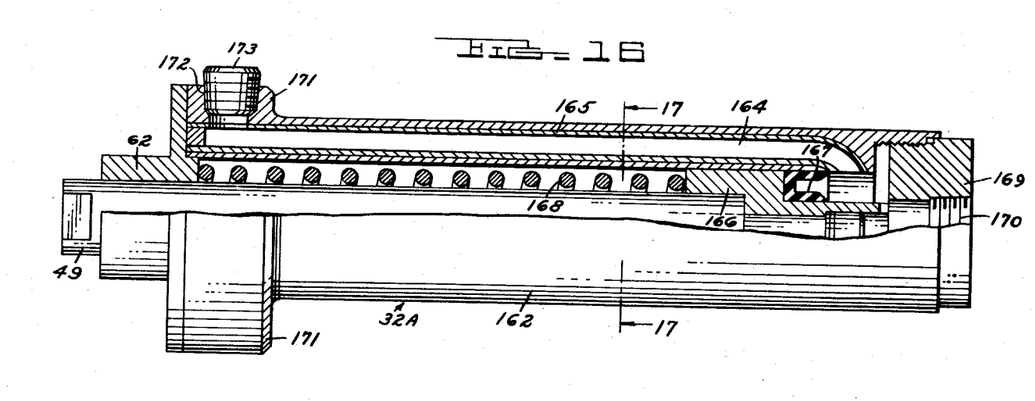
Fig. 16 is a view similar to Fig. 14 showing a modified housing assembly.
Figure 17:
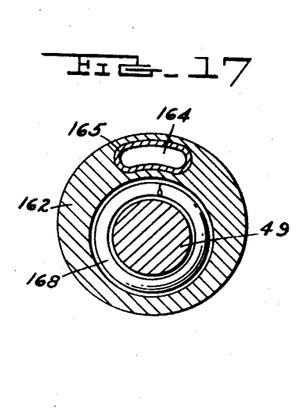
Fig. 17 is a cross-sectional view of Fig. 16 taken on the line 17—17 thereof showing the cast-in tube construction in more detail.

The tip holder arms, Figs. 1, 12, 13, 18, and 19 have cross beam reinforcing ribs with the vertical ribs 150—151 and 152—153 opposing the clamping forces and with the horizontal ribs 154—155 and 156—157 holding the arms against transverse bending under clamping forces to maintain the tips in rigid opposed alignment. The couplings 110 and 111, Figs. 12 and 13, are insertable and retractable with the fittings 102 and 103 on the interposed tubes 105 and the tubes 105 adjacent the tips 52 and 53 are first insertable into the couplings 110—111 and then the tips 52 and 53 are attached so that coolant is fed first directly to the tips via the hose nipples 158 and 159 and back-channeled to the outlet hose nipples 160—161.

The hydraulic-actuated spring-return power cylinder, Figs. 14–17, comprises housings 161 and 162 which differ relative to the side wall inclusion of the channels 163 which are drilled in the side wall and the channel 164 which is formed by inserting the tube 165 during casting. Both cylinders have a piston rod 49, piston 166, seal 167, and return spring 168 so that oil under pressure fed to the seal side of the piston 166 extends the rod 49 and compresses the spring 168 and oil can be so fed via the head 169 axial aperture 170 or by the channels 163 or 164 from the housing collar 171 radial aperture 172 with the plug 173 receivable in either aperture 170 or 172 depending on which inlet is used. Two inlets are provided to facilitate positioning the oil hose 174 at either end of the cylinder to so locate the hose to eliminate interference in gun handling and the piston 166 is removable from the rod 49 via the bolt 175 to facilitate assembly, inspection, and repair.

The support beam 180 is pivotally supported at 181, Fig. 1, and supports the gun 30 at one end via the tie 182 to the cable 34 and at the other end supports the supply unit 200 via the hanger 183 and counter balance adjusting bolt 184. The supply unit 200 is equipped with welding transformer 201 to which the cable 34 is connected at its upper end as at 202 and an air cleaner and lubricator 203 connected via the air hose 204 to the valve 205 on the booster assembly 33, and the unit 200 also has coolant feed and return manifolds (not shown) for supplying coolant in a circuit to each of the jaw electrode holders and the pivot pin via the feed hoses 206 and 207 to the holders, Fig. 1, and via the hose 208 to the pivot pin, Fig. 8, while the return flow is made via conduits in the cable 34 to keep same cool as is well understood in the art.

Figure 10:
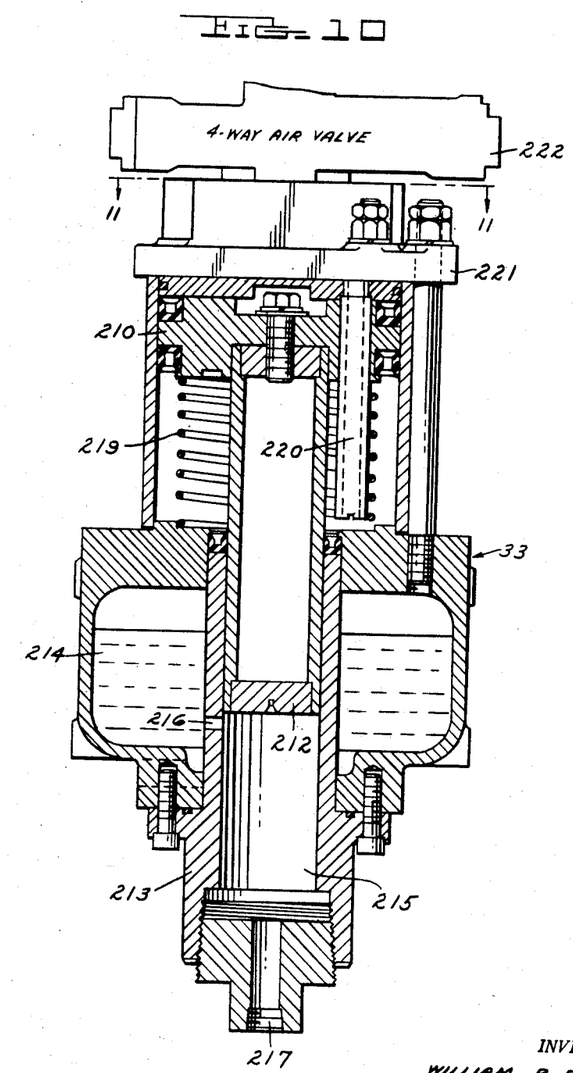
Fig. 10 is a longitudinal cross-sectional view of the double acting air-hydraulic booster assembly seen in Fig. 1.
Figure 11:
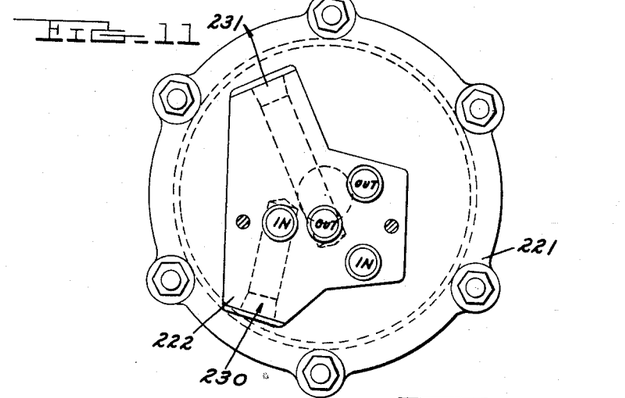
Fig. 11 is a cross-sectional view of the device seen in Fig. 10 taken on the line 11—11 thereof.

The power booster 33, Figs. 1, 10, and 11, comprises a large air piston 210 operating in the air cylinder 211 to which piston is attached the hydraulic piston 212 operating in the oil cylinder 213 which is surrounded by the oil reservoir 214 communicating to the cylinder 213 chamber 215 via the orifice 216 so that as the air piston 210 descends the oil piston 212 also descends closing the orifice 216 and forcing oil out the aperture 217 to the clamping cylinder 32 via the hose 218, Figs. 1 and 10, wherein the two-way supply and exhaust valve 205 is opposed by the spring 219 in the air cylinder 211 and the return air pressure tube 220 deleted whereas when the 4-way valve 221, Fig. 10, is employed the spring 219 is deleted and return air fed to the opposite side of the piston 210 via the tube 220 which is anchored on the head 221 and slidably disposed in the piston 210; the tube 220 return is open when the 4-way valve 222 supplies air to the top of the piston 210 to provide relief and to bleed off any air escaping between the tube 220 and the piston 210 whereas when air is supplied via the tube 220 to the bottom of the piston 210, the port in the valve 222 is open to the top of the piston 210. Obviously when the spring 219 and 2-way valve 205 are employed, a vent is supplied in the cylinder 211 adjacent its bottom to eliminate air back pressure interference.

In operation, the electrodes 52 and 53 are positioned adjacent a workpiece 56 as desired and the power booster 33 actuated by the usual controls to the 4-way valve 222 so that air is introduced to the top of the air piston 210 (the spring 219 being deleted) thereby forcing the air piston 210 downwardly which, in turn, forces the oil piston 212 downwardly past the orifice 216 so that the oil is forced through the aperture 217 and hose 218 to the hydraulic clamping cylinder 32 which moves the piston rod 49 outwardly to actuate the movable jaw via the linkage 51 so as to clamp the electrodes 52 and 53 on opposite sides of the workpiece 56. When the electrodes are clamped at one end of the gun 30 by the force exerted by the hydraulic cylinder 32 on the other end of the gun 30, the pivot pin 44 acts as a fulcrum point and is wedged between the stationary jaw bearing 43 and the movable jaw yoke 48 and forced into electrical conducting non-spaced relationship with the jaw yoke 48 via the conducting bearings 81, Fig. 8. Thus a solid electrical connection is provided to the one jaw via the pivot pin 44 while a direct electrical connection is made to the other jaw such as seen in Fig. 3 via the direct contact of the cable terminal 60 with the jaw terminals 61 as held by the bolt 70 and nut 73. It is to be further noted that the jumper arm 72 top terminal is directly connected to cable terminal 68 and the bottom terminal in solid connection with the pivot pin shoulder 75 and nut 74 so that solid electrical connections exist throughout the device when the electrodes are in clamped relationship whereupon the welding current is automatically supplied by the welding timer to make the weld as is well understood in the art. The pivot pin alternately can conduct current to the stationary jaw if desired as seen in Fig. 9.

After the weld is made the 4-way valve is actuated to its return position supplying air to the bottom side of the air piston 210 via the tube 220 to retract the air piston 210 and elevate the oil piston 212 to relieve oil pressure on clamping cylinder 32 which is returned by the spring 168 retracting the movable arm 54 to release the workpiece 56. It is to be noted, Fig. 11, that air is fed to the 4-way valve 222 via the connection 230 and exhausted therefrom via the port 231 with the valve effecting transfer of the pressure and relief to the top and bottom of the air piston 210 as diagrammatically seen in Fig. 11.

Coolant is constantly supplied to the stationary jaw holder 55 via the hose 207, to the movable jaw holder 54 via the hose 206, and to the pivot pin via the hose 208 and the returning coolant is returned via hoses, not shown, connected to the nipples 161 and 160 on the jaws and via the hose 209 on the pivot pin fitting 89.

During the clamped-welding condition of the gun the holder ribs 150—157 prevent outward flexing of the holder arms and also prevent lateral twisting of the arms to hold the electrodes 52 and 53 in alignment on one side of the pivot pin 44 while on the other side the sliding guide block 94 or 139 disposed in the guide channel 93 or 133 respectively support the lateral alignment of the electrodes 52 and 53 and prevent any twisting or turning adjacent the pivot pin 44 and provide a leverage advantage in supporting the pin to overcome the extended leverage of the holder arms 54 and 56.

When the 2-way valve 205 is used in conjunction with the power booster 33 the spring 219 is utilized to return the air piston 210 upon the release of air pressure and the tube 220 is deleted so that in the operation with the 2-way valve air is fed to the top of the piston 210 forcing the air piston 210 downwardly to compress the spring 219 and to move the oil piston 212 downwardly to force oil to the clamping cylinder 32 and upon the release of air pressure on the top of the air piston 210, the spring 219 elevates and returns the air piston 210 withdrawing the oil piston 212 to retract the movable jaw 46 via the return action of the piston 166 and rod 49 in the jaw actuating cylinder 32.

Since the gun 30 must be quickly mounted and removed relative to the workpiece 56 it is essential that the connections to the gun be made so as not to cause entanglement with the workmen and depending on the disposition of the jaws 42 and 46, the attachments of the electrical cable 34, and the coolant hoses it is sometimes found more convenient to connect the oil hose 218 close to the gun via the radial aperture 172 of cylinder 32 and 32A and this conveniently can be done by removing the plug 173 and inserting it in the remote axial aperture 170 so that the coolant is fed to the piston 166 via the housing channels 163 and 164 as seen in Figs. 14–17.

The inventive assembly with the features described constitutes a compact, durable, and neat appearing mechanism easily operated to accomplish high production, quickly repeated, welding operations over long periods of time and has been found to outlast competitive devices by considerable periods without entailing down time for repairs and the replacing of welding tips.

In this connection it is important to remember that the welding tips 52 and 53 are at the hottest points in the welding operation so that if they are not kept properly cool they readily mushroom under the clamping forces and heat thereby necessitating the shut down of the gun for replacing the welding tips. It is also important to note that the welding current being fed through the pivot pin would ordinarily entail arcing between movable-spaced parts except for the fact that the inventive gun utilizes the high clamping pressure to freeze the otherwise movable parts solid prior to the introduction of the welding current so that no destructive arcing occurs adjacent the pivot pin.

Although but a single embodiment of the invention has been shown and described in detail, with two alternate modifications, it is obvious that many changes may be made in the size, shape, detail, and arrangement of the various elements of the invention within the scope of the appended claims.

I claim:

1. A welding gun comprising a stationary jaw having an intermediate fulcrum hinge portion, an electrode end on one side of said hinge portion, and an actuating end on the other side of said hinge portion, a movable jaw having an intermediate fulcrum hinge portion, an electrode end on one side of said hinge portion opposing said stationary jaw electrode end, and an actuator end coacting with said stationary jaw actuating end on the other side of said hinge portion, a hinge pivot pin disposed in and interconnecting said jaw hinge portions; a power cylinder on one said jaw actuating end having a piston rod connected to the other said jaw actuating end so as to open and close said jaws with said pin as fulcrum pivot point, a welding current terminal on one said jaw for directly connecting a welding current cable terminal thereto, a welding current terminal on said pivot pin, electrically insulating washers and sleeves between said jaws and between one said jaw and said pin, and a conducting sleeve between said other jaw and said pin; said jaws in the clamped condition forcing said other jaw, conducting sleeve, and pin into a solid electrical connection incident to the fulcrum forces developed in clamping said electrode ends on a workpiece.

2. In a device as set forth in claim 1, one said jaw actuating end having a bearing slide block receiving guide chamber and said other jaw actuating end having a bearing slide block thereon nesting in said guide chamber counteracting electrode end torsional forces tending to move said electrode ends out of alignment by twisting in said hinge portions to reinforce said jaw hinge on one side against the twisting forces exerted on the other side of said jaw hinge so as to support said hinge portions and pin in holding said electrode ends in alignment.

3. A welding gun comprising paired clamping jaws, a pivot pin hingedly interconnecting said jaws, electrode ends on said jaws for welding a workpiece, means electrically insulating said jaws from one another at said pivot pin, means electrically insulating one said jaw from said pivot pin, means on said one jaw which is insulated from said pin for connecting one side of a welding current cable thereto; said other jaw being in electrical contact with said pivot pin; means on said pivot pin for connecting the other side of a welding current cable thereto for supplying welding current to said other jaw via said pivot pin; said jaws being forcibly closable by power means to move said jaw electrode ends into a clamped condition on a workpiece around a fulcrum point at said pivot pin; said pivot pin and said other jaw in electrical contact therewith being forced into solid non-spaced electrical contact with each other under the clamping forces exerted through said jaws by said power means.

4. A welding gun comprising paired clamping jaws, a pivot pin hingedly interconnecting said jaws, electrode ends on said jaws for welding a workpiece; means electrically insulating said jaws from one another at said pivot pin, means electrically insulating one said jaw from said pivot pin, means on said one jaw which is insulated from said pin for connecting one side of a welding current cable thereto; said other jaw being in electrical contact with said pivot pin; means on said pivot pin for connecting the other side of a welding current cable thereto for supplying welding current to said other jaw via said pivot pin, and power means on said jaws for forcibly closing said jaw electrode ends in a clamped condition on a workpiece around a fulcrum point at said pivot pin; said pivot pin and said other jaw in electrical contact therewith being forced into solid non-spaced electrical contact with each other under the clamping forces exerted through said jaws by said power means.

5. In a device as set forth in claim 4, said jaws including electrode holder arms having cross beam parallel and transverse ribs forming a structural web for resisting direct clamping forces and for resisting indirect lateral forces tended to move said arms out of parallel alignment.

6. In a device as set forth in claim 4, one said jaw having a slide block bearing chamber and the other said jaw having a slide block bearinged in said chamber; said chamber and block being spaced from said pivot pin to support said pivot pin against torsional forces to maintain said jaws in opposed alignment.

7. A welding gun comprising pivotal jaws wherein one said jaw has a slide block bearing chamber and the other said jaw having a slide block bearinged in said chamber; said chamber and block being spaced from the jaw pivot to support said pivot against torsional forces to maintain said jaws in opposed alignment.

References Cited in the file of this patent
UNITED STATES PATENTS

| | | |
|---|---|---|
| 1,256,951 | Thomson | Feb. 19, 1918 |
| 1,645,705 | Ledwinka | Oct. 18, 1927 |
| 1,750,757 | Johnson | Mar. 18, 1930 |
| 2,341,458 | Martin | Feb. 8, 1944 |
| 2,434,351 | Countemanche | Jan. 13, 1948 |
| 2,496,104 | Paner | Jan. 31, 1950 |
| 2,514,747 | Daniels | July 11, 1950 |